(12) United States Patent
Brendel

(10) Patent No.: US 12,542,866 B2
(45) Date of Patent: Feb. 3, 2026

(54) METHOD FOR RECORDING IMAGE DATA

(71) Applicant: Arnold & Richter Cine Technik Gmbh & Co. Betriebs KG, Munich (DE)

(72) Inventor: Harald Brendel, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 63 days.

(21) Appl. No.: 18/734,530

(22) Filed: Jun. 5, 2024

(65) Prior Publication Data

US 2025/0008052 A1    Jan. 2, 2025

(30) Foreign Application Priority Data

Jun. 30, 2023  (DE) .......................... 102023117310.3

(51) Int. Cl.
*H04N 5/911*    (2006.01)
*H10F 39/00*    (2025.01)

(52) U.S. Cl.
CPC ........... *H04N 5/911* (2013.01); *H10F 39/802* (2025.01)

(58) Field of Classification Search
CPC ........ H04N 5/911; H04N 23/71; H04N 23/81; H04N 25/60; H04N 23/76; H04N 23/70; H10F 39/802

(Continued)

(56) References Cited

U.S. PATENT DOCUMENTS 7,509,042 B2 *  3/2009  Mori .................. G03B 15/05
                                                   348/371
9,648,245 B2 *  5/2017  Lee .................... H04N 23/667

(Continued)

FOREIGN PATENT DOCUMENTS

DE    102013209164 A1    12/2014
WO    2023016042 A1      2/2023

OTHER PUBLICATIONS

German Search Report issued in Application No. 10 2023 117 310.3, dated Dec. 19, 2023.

(Continued)

*Primary Examiner* — Helen Shibru
(74) *Attorney, Agent, or Firm* — Amster, Rothstein & Ebenstein LLP

(57) ABSTRACT

A method for recording image data by means of a camera, in particular by means of a motion picture camera, is provided. In this respect, the camera comprises an image sensor with an adjustable sensitivity that comprises a plurality of light-sensitive detector elements arranged in rows and columns and that is configured to generate a respective electric charge in dependence on the intensity of light that is incident on a respective detector element during a respective single exposure, to amplify said respective electric charge in dependence on the set sensitivity and to convert it into a respective image signal value. The method comprises: a recording sensitivity and a target sensitivity being predefined, wherein the recording sensitivity deviates from the target sensitivity by an exposure correction value; image data being recorded by means of the camera while the sensitivity of the image sensor is set to the recording sensitivity; a noise correction being determined in dependence on the target sensitivity and/or the exposure correction (Continued)

value; and corrected image data being generated by modifying the recorded image data based on the noise correction.

16 Claims, 1 Drawing Sheet

(58) Field of Classification Search
USPC .......................................................... 386/264
See application file for complete search history.

(56) References Cited

U.S. PATENT DOCUMENTS

| | | | |
|---|---|---|---|
| 11,153,498 B2 * | 10/2021 | Park | H04N 25/585 |
| 11,838,649 B2 * | 12/2023 | Sekine | H04N 25/13 |
| 2004/0179131 A1 * | 9/2004 | Honda | H04N 23/633 |
| | | | 348/E5.034 |
| 2004/0239771 A1 * | 12/2004 | Habe | H04N 23/71 |
| | | | 348/229.1 |
| 2007/0116450 A1 * | 5/2007 | Kijima | G03B 7/095 |
| | | | 348/E5.04 |
| 2010/0315521 A1 * | 12/2010 | Kunishige | H04N 1/215 |
| | | | 348/E5.037 |
| 2013/0242144 A1 | 9/2013 | Ovsiannikov | |
| 2013/0314603 A1 | 11/2013 | Ikeda | |
| 2014/0085507 A1 | 3/2014 | Pillman et al. | |
| 2023/0269467 A1 * | 8/2023 | Uemura | H04N 23/667 |
| | | | 348/229.1 |

OTHER PUBLICATIONS

Extended Search Report issued in European Patent Application No. 24179575.6, dated Oct. 31, 2024.

* cited by examiner

METHOD FOR RECORDING IMAGE DATA

The invention relates to a method for recording image data by means of a camera, in particular by means of a motion picture camera.

One or more individual images of a respective scene may be recorded as image data by means of a camera in that light that emanates from (is radiated or reflected by) objects of the scene is deflected by an optics of the camera onto an image sensor of the camera so that the scene is imaged onto the image sensor. The image sensor in this respect generally comprises a plurality of light-sensitive detector elements that are arranged in rows and columns and that are each configured to generate a respective electric charge in dependence on the intensity of the light incident on the respective detector element and to convert it into a respective image signal value. In this way, a respective image signal value may be generated for each detector element during a respective single exposure—i.e. during a single exposure process in which light of the scene is incident on the detector elements substantially simultaneously for a certain time period (shutter speed). The image signal values generated as a result of a respective single exposure then together form a respective individual image.

By means of a respective detector element, only light whose intensity lies within a certain intensity range may be sensibly converted into a respective image signal value so that the respective image signal value is actually meaningful for the respective intensity of the light. This is because if the intensity is too high (overexposure), the detector element becomes saturated so that different intensities that are too high cannot be distinguished since they lead to the same (maximum) image signal value; if, on the other hand, the intensity is too low (underexposure), the conversion of the incident light into a respective image signal value is dominated by a generally unavoidable noise of the image sensor so that different intensities that are too low cannot be distinguished since they are lost in the noise. In this respect, the noise may comprise, on the one hand, portions of an electronic noise from various electronic components of the respective detector element or of the image sensor and, on the other hand, portions of a noise caused by the quantum nature of the light (e.g. shot noise). Said intensity range for which meaningful image signal values may be generated is therefore limited and defines a dynamic range of the image sensor.

When recording image data, the aim is usually to ensure that, possibly for each detector element, the light incident thereon has an intensity within said intensity range. Ideally, the overall intensity of the light is in this respect at least largely in a medium range of the intensity range so that the resulting image has a medium brightness and a large range of the dynamic range of the image sensor may be utilized overall, from shadows up to highlights of the scene. Depending on the artistic design intention, a different brightness distribution may, however, also be sought after.

The intensity of the light incident on a respective detector element depends, on the one hand, on the brightness of the respective object of the scene from which the light emanates, wherein this brightness may be influenced by a lighting, in particular an artificial lighting, of the scene. On the other hand, the intensity of the incident light may depend on various further parameters, namely in particular on the generally adjustable aperture of a diaphragm of the camera and on the generally adjustable shutter speed of a camera shutter. For the cross-section of the incident beam is ideally restricted in the region of the main plane of the camera optics by the diaphragm, in dependence on the respective set aperture, and thereby spatially influences the amount of light that is incident on the image sensor during a respective single exposure; the duration of the respective single exposure is limited by the shutter, which may be a mechanical or an electronic shutter (for instance, realized by a corresponding control of the image sensor), in dependence on the respective set shutter speed and the amount of light that is incident on the image sensor during a respective single exposure is thereby limited in time.

The sensitivity of the image sensor, which is preferably adjustable and is usually predefined as a so-called ISO value, has a further influence on the image brightness. However, the ISO setting does not change the amount of light incident on the image sensor, but the way in which this light is converted into a respective image signal value via a respective generated electric charge, in particular how much the electric charge is amplified. In this respect, this amplification may also run into saturation and furthermore causes a noise dependent on the level of amplification.

It may in particular occur during motion picture recordings that image data with related content are successively recorded in several sections and the exposure conditions, which influence the amount of light that is incident on the image sensor and in particular result (at least among other things) from the brightness or lighting of the recorded scene, the set aperture of the diaphragm and/or the set shutter speed of the camera shutter, change in between. Such a change in the exposure conditions may occur for reasons that cannot be influenced or only influenced with difficulty, for example if it is caused by fluctuations in daylight. However, the change in the exposure conditions may also be a side effect of an intentional adjustment, for example if the aperture of the diaphragm is adjusted for creative reasons, for instance to change the depth of field.

It may therefore be necessary to compensate a change in the exposure conditions so that image data recorded under different exposure conditions match one another in terms of their respective brightness. Such a compensation may, for example, be achieved by ND filters (neutral density filters) that filter out a defined portion of the light. This portion is usually specified as the optical density of the ND filter. For example, an optical density of 0.3 (more precisely: log 10 2) corresponds to a reduction in the light intensity by one f-stop, which in turn corresponds to a halving of the amount of light. Such ND filters may be attached in front of a lens of the camera and/or in the camera between the lens and the image sensor. However, the attachment of one or more ND filters in front of the lens may delay the work on the set of the respective shoot. Furthermore, ND filters attached in front of the lens may lead to disturbing reflections. ND filters provided in the camera increase the design effort of the camera. It is therefore generally advantageous if ND filters can be avoided.

Particularly high-quality cameras now have a large dynamic range that generally allows (at least to a certain extent) that a change in the exposure conditions does not necessarily have to be compensated by changing the amount of incident light, for instance by using ND filters, as long as the change only shifts the brightness to such an extent that even the brightest regions do not yet run into saturation or the darkest regions do not yet drown in noise. If the dynamic range is sufficient, the image data may therefore generally be recorded without a specific adaptation to the changed exposure conditions, but are then correspondingly brighter or darker.

The changed brightness may generally be adapted to the image data recorded under the original conditions by adjusting the sensitivity of the image sensor accordingly. However, for fundamental reasons (due to the quantum nature of light), the image data recorded with a changed sensitivity have a different noise (signal-to-noise ratio) compared to the image data recorded under the original image conditions as a result of the changed exposure conditions in relation to the respective sensitivity of the image sensor. Image data recorded successively under different exposure conditions may then have a perceptibly different character due to the different noise. Such unintended differences in the image noise may be unacceptable, in particular in the context of high-quality motion picture recordings, such as for cinema productions.

It is an object of the invention to provide a method for recording image data by means of a camera, in particular by means of a motion picture camera, that enables a simple compensation of a change in the exposure conditions and in this respect avoids the disadvantages of the prior art, in particular does not require ND filters and does not lead to perceptible changes in the image noise.

The object is satisfied by a method having the features of claim 1. Advantageous embodiments result from the dependent claims, from the present description and from the Figures.

The method according to the invention serves to record image data by means of a camera, in particular by means of a motion picture camera. The image data may be still image data in the form of an individual image or moving image data in the form of a sequence of individual images, wherein the individual images of the sequence are preferably recorded at a constant frame rate. The camera in this respect comprises an image sensor with an adjustable (settable) sensitivity that comprises a plurality of light-sensitive detector elements arranged in rows and columns and that is configured to generate a respective electric charge in dependence on the intensity of light that is incident on a respective detector element during a respective single exposure, to amplify said respective electric charge in dependence on the set sensitivity and to convert it into a respective image signal value.

The image signal values obtained in this way during a respective single exposure then together form image data of a respective individual image. In other words: A respective individual image corresponds to a data set of image signal values that are generated due to a respective single exposure (i.e. a defined time period in which light of the scene to be recorded is continuously incident on the image sensor and leads to the generation of electric charges).

The camera may further comprise a diaphragm that has an adjustable aperture and that is configured to reduce the amount of light that is incident on the image sensor during the respective single exposure in dependence on the set aperture—for instance by restricting the cross-section of the incident beam, ideally in the region of the main plane of a camera optics. Furthermore, the camera may comprise a (mechanical or electronic) shutter with an adjustable shutter speed (i.e. exposure time) that is configured to limit the duration of the respective single exposure during which light is incident on the image sensor to the set shutter speed. Such a shutter may, for example, be configured in the form of a rotating sector shutter (also called a revolving aperture) whose rotational speed and/or shutter opening size is/are adjustable.

According to the invention, the method comprises: a recording sensitivity and a target sensitivity being predefined, wherein the recording sensitivity deviates from the target sensitivity by an exposure correction value; image data being recorded by means of the camera while the sensitivity of the image sensor is set to the recording sensitivity; a noise correction being determined in dependence on the target sensitivity and/or the exposure correction value; and corrected image data being generated by modifying the recorded image data based on the noise correction. The corrected image data may then be output by the camera.

The recording sensitivity and the target sensitivity may each in particular be specified in the form of a so-called ISO value that substantially corresponds to the ISO sensitivity of a photographic film. To record the image data, the image sensor is set to the recording sensitivity. In this regard, the recording sensitivity is an actually set sensitivity of the image sensor. In contrast, the target sensitivity may represent a merely nominal sensitivity, namely insofar as it can be predefined by the target sensitivity that the corrected image data should ultimately appear as if they had been recorded by means of an image sensor set to the target sensitivity.

The exposure correction value is preferably not equal to zero and may in particular be specified in f-stops. In this respect, one f-stop corresponds to a change in the sensitivity such that, depending on the sign of the exposure correction value, a doubling or halving of the amount of light incident on the image sensor is compensated by the change in the sensitivity. In which direction the correction is made with which sign, is a matter of definition. In the present context, changing the sensitivity of the image sensor by a negative exposure correction value is intended to mean that the sensitivity is reduced, i.e. the ISO value decreases. In the case of a negative exposure correction value, the recording sensitivity is therefore lower than the target sensitivity.

The predefining of the recording sensitivity and the target sensitivity may take place by a user of the camera, for example by means of an input apparatus of the camera. The recording sensitivity and the target sensitivity do not necessarily both need to be directly predefined since, instead, only one of these sensitivities may be predefined and the exposure correction value may be directly predefined in place of the other sensitivity, whereby the other sensitivity is also indirectly predefined since it may be clearly derived from the one sensitivity and the exposure correction value. Provision may in particular be made that the target sensitivity and the exposure correction value are directly predefined, wherein the recording sensitivity may then be determined from the target sensitivity and the exposure correction value and is thus indirectly predefined. For example, a value of ISO 800 may be predefined as the target sensitivity and a value of −1 f-stop may be predefined as the exposure correction value, whereby a recording sensitivity of ISO 400 is indirectly predefined.

Said noise correction is determined in dependence on the target sensitivity and/or the exposure correction value. The noise correction is preferably determined in dependence on both the target sensitivity and the exposure correction value. In this respect, the target sensitivity and the exposure correction value again do not necessarily have to be directly used for determining the noise correction, but one of these values may also indirectly result from the respective other one in conjunction with the recording sensitivity. In this regard, the noise correction may also be determined in (direct or indirect) dependence on the recording sensitivity.

The noise correction serves to compensate the differences between the noise which an individual image recorded by means of the image sensor set to the recording sensitivity actually has and the noise that would be expected for an individual image recorded by means of the image sensor set to the target sensitivity. In principle, various ways can be considered for determining such a noise correction in dependence on the target sensitivity and/or the exposure correction value (or the recording sensitivity). For example, the noise correction may be based on empiricism by comparing how the noise differs at different sensitivities based on image data that were recorded at different sensitivities of the image sensor, wherein the noise correction may then be determined in dependence on this difference. Alternatively or additionally, a theoretical model of the noise may also be used for determining the noise correction. The empirical data and the theoretical model may in this respect be of a general nature and may thus be valid for different image sensors (of a specific type) or may be determined or defined specifically for the respective image sensor, however.

Finally, the recorded image data are modified based on the determined noise correction and corrected image data are generated in this way. The fact that the corrected image data are generated by modifying the recorded image data based on the noise correction is not intended to rule out that the generation of the corrected image data comprises even further steps, in particular further modifications of the recorded image data.

For example, the generation of the corrected image data may furthermore comprise modifying the brightness of the recorded image data to compensate remaining brightness deviations. The recorded image data are in this respect preferably modified in terms of their brightness in dependence on the exposure correction value. This modification may comprise multiplying the recorded image data, in particular the image signal values, by an exposure correction factor that is (in particular exponentially) dependent on the exposure correction value, wherein this exposure correction factor may additionally depend on the respective image signal value. If a gamma correction has been applied to the image signal value, it may further be provided that the image signal value is first linearized again (inverse gamma correction) before it is multiplied by the exposure correction factor, and the gamma correction is subsequently applied again.

Due to the method according to the invention, the corrected image data may then largely match, in terms of their brightness and their noise, other image data that were recorded before the exposure conditions were changed, without the need to use ND filters. The effort and difficulties usually associated with the use of ND filters may thus easily be avoided.

The term "image sensor with an adjustable sensitivity" has a broad meaning in the present context and it includes not only the light-sensitive detector elements themselves (e.g. in CMOS technology) but also integrated or associated amplification electronics (e.g. column amplifiers for the columns of light-sensitive detector elements, as known from DE 102013209164 B4 for example).

According to an advantageous embodiment, provision is made that if the recording sensitivity is lower (has a smaller ISO value) than the target sensitivity (i.e. the exposure correction value is negative), a respective noise value is determined as the noise correction for each image signal value of the recorded image data and the corrected image data are generated by adding the respective noise value to each image signal value (wherein the generation of the corrected image data does not necessarily have to be limited to this, but may also include further modifications of the recorded image data).

In this regard, the noise correction may correspond to a data set of noise values that, in terms of its resolution, i.e. the number of individual values arranged in rows and columns, corresponds to a respective individual image that is recorded by the camera and that is formed from the image signal values generated during a respective single exposure. Thus, for a respective individual image, a respective noise value may be assigned to each image signal value of the individual image and is added to the respective image signal value for the generation of the corrected image data. This addition may in particular correspond to a simple addition of the respective image signal value and the respective noise value. The respective noise value may also be zero for at least one or some image signal values; i.e. not every image signal value necessarily has to be modified.

If the recording sensitivity is lower than the target sensitivity, the image data recorded at the recording sensitivity will have a reduced noise compared to a recording at the target sensitivity. By adding said noise values, the recorded image data are provided with an additional noise so that the reduced noise may be compensated in this way.

The method according to the invention may generally also be limited to the recording sensitivity being lower than the target sensitivity so that a respective noise value is therefore always determined as the noise correction for each image signal value of the recorded image data and the corrected image data are generated by adding the respective noise value to each image signal value.

According to a further advantageous embodiment, provision is made that if the recording sensitivity is higher (has a greater ISO value) than the target sensitivity (i.e. the exposure correction value is positive), a noise filter is determined as the noise correction and the corrected image data are generated by filtering the recorded image data by means of the noise filter (wherein the generation of the corrected image data is not necessarily limited to this, but may also include further modifications of the recorded image data).

Due to the dependence on the target sensitivity and/or the exposure correction value (or the recording sensitivity), the noise filter may be specially adapted to filter out noise components characteristic of the respective sensitivity. Generally known noise suppression methods may be used for the filtering, wherein the filter parameters are specifically selected with regard to the target sensitivity and/or the exposure correction value (or the recording sensitivity). In this respect, the filter parameters may, for example, be determined by calculation or using a look-up table in dependence on the target sensitivity and/or the exposure correction value (or the recording sensitivity).

If the recording sensitivity is higher than the target sensitivity, the image data recorded at the recording sensitivity will have an increased noise compared to a recording at the target sensitivity. The noise in the recorded image data is reduced by the filtering by means of the noise filter so that the increased noise may be compensated in this way.

The method according to the invention may generally also be limited to the recording sensitivity being higher than the target sensitivity so that a noise filter is therefore always determined as the noise correction and the corrected image data are generated by filtering the recorded image data by means of the noise filter.

According to a further advantageous embodiment, the noise correction is determined based on a noise characteristic of the image sensor. This noise characteristic may generally be equally defined in a model-generic manner, i.e. in the same manner for all identically designed image sensors of a specific image sensor model. However, the noise characteristic is preferably defined in a specimen-specific manner, i.e. individually defined for the specific specimen of an image sensor used in the camera. The method may comprise first determining the noise characteristic, in particular as part of calibration steps that precede the aforementioned method steps. In this respect, the determination of the noise characteristic preferably takes place empirically. Once the noise characteristic has been determined, it or data that define it may, for example, be stored in a memory of the camera from which it or said defining data may then be read out to determine the noise correction.

According to an advantageous further development, the noise characteristic comprises a theoretical model, in particular a mathematical model, for the noise of the image sensor. The determination of the noise correction then comprises calculating data for the noise correction by means of the model. The calculated data may in particular be the noise values mentioned.

According to another advantageous further development, the noise characteristic comprises a look-up table. In other words, the noise characteristic or at least parts of the information included in the noise characteristic may be stored in a look-up table. The determination of the noise correction then comprises reading out data for the noise correction from the look-up table. The data read out from the look-up table may in particular be said noise values or data from which these noise values may be derived.

Said look-up table may, for example, include a standard deviation for each detector element of the image sensor. The standard deviations may have been determined by temporal measurements. This may in particular comprise image signal values being acquired over a certain time period under defined conditions, for example with an at least substantially uniform illumination of the image sensor, and determining the standard deviation of all the image signal values generated at the respective detector element during this time period for each detector element. The noise values may then be determined based on these standard deviations. In this respect, the look-up table may include different standard deviations for different target sensitivities and/or exposure correction values (or recording sensitivities). However, the target sensitivity and/or the exposure correction value (or the recording sensitivity) may also (only) be included in the determination of the noise values based on the standard deviations.

If the noise characteristic comprises both said theoretical model for the noise of the image sensor and said look-up table, parameters of the model, in particular different parameters for different target sensitivities and/or exposure correction values (or recording sensitivities), may also be stored as data in the look-up table and may then be read out from the look-up table. Subsequently, said noise values or another noise correction may, for example, be calculated by means of the model parameterized in this way, in particular in dependence on the target sensitivity and/or the exposure correction value (or the recording sensitivity).

The corrected image data may generally be generated outside the camera, i.e. the step of correcting the image data based on the noise correction may also be performed outside the camera in some embodiments. For example, the recorded image data may be output by the camera and may then be modified based on the noise correction by means of an apparatus external to the camera, for example by means of a separate image processing unit (in particular locally or remotely) or by means of a remote distributed image processing device (in particular a data center and/or "cloud" server). The step of correcting the image data based on the noise correction may in particular also take place temporally independently of the step of recording the image data using the camera, without this having to take place immediately afterwards.

According to an advantageous embodiment, the generation of the corrected image data takes place in the camera, preferably immediately after the recording of the image data and possibly continuously during the recording of further image data. If the corrected image data are generated in the camera, the camera may subsequently output them. Provision may in particular be made that the camera always outputs the image data in an already corrected form, either together with the recorded (not yet corrected) image data or only the corrected image data.

To generate the corrected image data, the camera may comprise an image processing unit that is configured to generate the corrected image data. Furthermore, the determination of the noise correction may also take place in the camera, for which purpose the image processing unit (if provided) is furthermore configured to determine the noise correction. Furthermore, it is advantageous if the recording sensitivity and the target sensitivity may also be predefined at the camera, for which purpose the camera may have an input apparatus. In this way, neither an apparatus external to the camera nor accessories for the camera need to be provided to perform the method. The image processing unit may be part of a control apparatus of the camera to which the input apparatus (if provided) may be connected.

According to a further advantageous embodiment, the method further comprises: reference image data first being recorded under given exposure conditions (i.e. under the exposure conditions currently present due to external circumstances and/or respective settings, in particular of the lighting, the diaphragm and/or the shutter) by means of the camera while the sensitivity of the image sensor is set to the target sensitivity; and after a change in the exposure conditions, the exposure correction value being determined in dependence on the change in the exposure conditions. The exposure correction value may in this respect be determined directly or indirectly by determining, in dependence on the change in the exposure conditions, the new recording sensitivity whose deviation from the target sensitivity corresponds to the exposure compensation value.

In other words, prior to the above-mentioned method steps, at least prior to predefining the recording sensitivity, the recording sensitivity is first determined (directly or indirectly via the exposure correction value) and indeed based on a change in the exposure conditions that occurred after image data had previously been recorded that are referred to here as reference image data (primarily for a conceptual differentiation from the image data recorded as part of the further method). In this respect, the exposure conditions are in particular defined by the brightness or lighting of the recorded scene, by the set aperture of a diaphragm of the camera and/or by the set shutter speed of a shutter of the camera and may in particular change due to a change in the brightness/lighting, the aperture and/or the shutter speed. As the exposure correction value, it may in particular be determined to what extent the sensitivity of the image sensor must be changed due to the change in exposure conditions in order to record image data whose brightness at least substantially corresponds to that of the reference image data.

The object of the invention is also satisfied by a method for modifying image data that comprises the following steps:
receiving image data of a camera, in particular a motion picture camera, that corresponds to a set recording sensitivity;

receiving the set recording sensitivity;
receiving a target sensitivity;
determining a noise correction in dependence on the recording sensitivity and the target sensitivity; and
modifying the received image data using the noise correction.

The image data may in particular have been recorded with a set recording sensitivity and/or generated by an image sensor with an adjustable sensitivity, as explained above. In some embodiments, the set recording sensitivity may be received separately from the image data or the set recording sensitivity may be embedded in the image data (in particular as metadata) and received together with the image data. The target sensitivity may be received via user input in some embodiments. Furthermore, in some embodiments, the noise correction may be determined indirectly via an exposure correction value that represents a deviation of the recording sensitivity from the target sensitivity, i.e. the noise value may also be determined in dependence on such an exposure correction value, as explained above.

The method makes it possible to reproduce an image impression that corresponds to a recording sensitivity other than the one actually set when recording the image data, namely a selectable target sensitivity. At the same time, the method allows a reproducible modification of the image data, i.e. the perceived image noise always and to the same extent corresponds to the respective (actual or virtual) sensitivity (set recording sensitivity or selected target sensitivity). This is in particular important for motion picture recordings, for example when a plurality of motion picture recordings are combined into a single sequence during film editing.

The object of the invention is also satisfied by a camera, in particular a motion picture camera, that comprises: an image sensor with an adjustable sensitivity that comprises a plurality of light-sensitive detector elements arranged in rows and columns and that is configured to generate a respective electric charge in dependence on the intensity of light that is incident on a respective detector element during a respective single exposure, to amplify said respective electric charge in dependence on the set sensitivity and to convert it into a respective image signal value; and a control apparatus that is configured to control the camera to record image data in accordance with the method according to the invention, in particular in accordance with any one of the above-described embodiments of the method.

The control apparatus may furthermore be configured to determine the noise correction and/or to generate the corrected image data. If the camera comprises a separate image processing unit, this may also take place by the control apparatus controlling the image processing unit to determine the noise correction or to generate the corrected image data. However, the image processing unit may also be integrated in the control apparatus.

The control apparatus and/or image processing unit respectively mentioned in connection with the invention may comprise, for example, an integrated circuit (IC), a microprocessor, a central processing unit (CPU), a graphics processing unit (GPU), an application-specific integrated circuit (ASIC) and/or a field programmable gate array (FPGA), or may at least substantially be formed thereby.

Furthermore, the camera may comprise an input apparatus (in particular the one already mentioned further above) by means of which the recording sensitivity, the target sensitivity and/or the exposure correction value may be predefined. The control apparatus may then receive the recording sensitivity, the target sensitivity and/or the exposure correction value from the input apparatus and, based thereon, may control the camera for recording, may determine the noise correction and may generate the corrected image data.

According to an advantageous embodiment, the camera further comprises a memory in which a noise characteristic of the image sensor is stored, wherein the control apparatus is configured to read out the noise characteristic from the memory and to determine the noise correction based on the read-out noise characteristic. The fact that the noise characteristic is stored in the memory may in this respect mean that at least data that are relevant for the noise characteristic of the image sensor are stored in the memory.

The camera may further be configured in one of the ways described above in connection with the method according to the invention. Embodiments described for the method and their advantages also apply accordingly to the camera.

DESCRIPTION OF THE DRAWINGS

The invention will be explained further in the following only by way of example with reference to the Figures.

DETAILED DESCRIPTION

Figure 1:
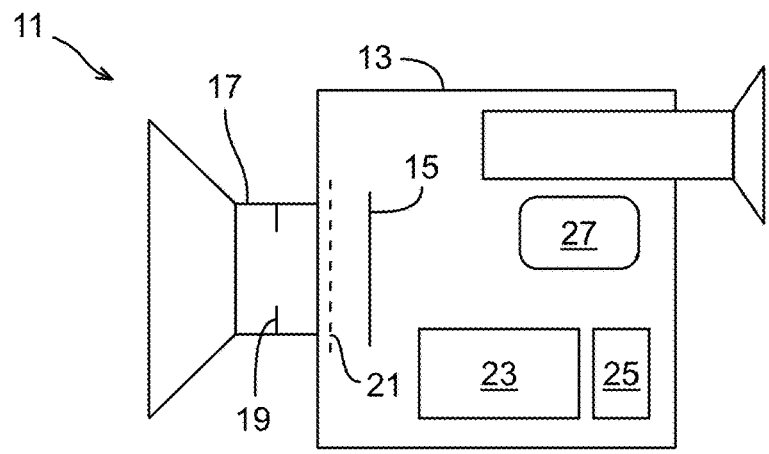
FIG. 1 shows an embodiment of a camera according to the invention in a simplified schematic representation.

The camera 11 shown in FIG. 1, which is a motion picture camera, comprises a camera housing 13, in which an image sensor 15 of the camera 11 is arranged, and a lens 17 attached to the camera housing 13. The lens 17 is configured to image light of a scene to be recorded (not shown) onto the image sensor 15.

The image sensor 15 comprises a plurality of light-sensitive detector elements arranged in rows and columns and is configured to generate a respective electric charge in dependence on the intensity of the light that passes through the lens 17 during a respective single exposure and is incident on a respective one of the detector elements. In this respect, the image sensor 15 has an adjustable sensitivity and is configured to amplify the respective electric charge in dependence on the set sensitivity and to convert it into a respective image signal value. The image signal values generated in this way during a respective single exposure then together form a respective individual image. As a motion picture camera, the camera 11 is configured to record a sequence of a plurality of individual images at a constant, preferably settable, frame rate by a plurality of rapidly successive single exposures. The image data which the camera 11 is configured to record are in this regard formed by these individual images.

The camera 11 further comprises a diaphragm 19 that may generally be integrated into the lens 17 or may also be independent thereof. The diaphragm 19 has an adjustable aperture which restricts the cross-section of the beam incident through the lens 17 and by which the amount of light that is incident on the image sensor 15 during a single exposure may thus be influenced. Furthermore, the camera 11 comprises a shutter 21 that is schematically shown by a broken line. The shutter 21 has an adjustable shutter speed by which the duration of the respective single exposure during which light is incident on the image sensor 15 is determined. The shutter 21 may be realized by a mechanical element or as an electronic shutter. For example, the shutter 21 may be configured in the form of a revolving aperture.

Furthermore, the camera 11 comprises a control apparatus 23, a memory 25 in which a noise characteristic is stored which is in particular determined empirically for the respective image sensor 15 and which may be read out by the control apparatus 23, and an input apparatus 27 via which the control apparatus 23 may receive user inputs. The control apparatus 21 is configured to set the sensitivity of the image sensor 15, the aperture of the diaphragm 19 and the shutter speed of the shutter 21 and generally to control the camera 11 to record image data in accordance with the settings made. The control apparatus 21 is in particular configured to control the camera 11 to record image data in accordance with the method 29 illustrated in FIG. 2.

The method 29 comprises, as method step 31, a recording sensitivity and a target sensitivity being predefined, wherein the recording sensitivity deviates from the target sensitivity by an exposure correction value. The recording sensitivity, the target sensitivity and/or the exposure correction value may in particular be entered via the input apparatus 27. However, this is not absolutely necessary since they may also be predefined in other ways. For example, the target sensitivity may be defined in advance and the exposure correction value may be determined beforehand as part of the method 29 (as will be explained further below), whereby these two values are then predefined in method step 31.

The method 29 further comprises, as method step 33, image data being recorded by means of the camera 11 while the sensitivity of the image sensor 15 is set to the recording sensitivity. A sequence of individual images may in particular be recorded in that a plurality of single exposures follow one another quickly and, in each single exposure, an amount of light dependent on the aperture of the diaphragm 19 and on the shutter speed of the shutter 21 is incident on the detector elements of the image sensor 15 and is converted via consequently generated electric charges generated into image signal values that then form the respective individual image.

In a further method step 35, the recording sensitivity is compared with the target sensitivity (or the sign of the exposure correction value is evaluated). If the recording sensitivity is lower than the target sensitivity (negative exposure correction value), the method is continued with method step 37; otherwise, the method is continued with method step 39. In both method steps 37, 39, a noise correction is respectively determined in dependence on the target sensitivity and/or the exposure correction value, wherein this in each case comprises said noise characteristic being read out from the memory 25 and the noise correction being determined based on the read-out noise characteristic. For example, the noise characteristic may be stored in the memory 25 at least partly in the form of a look-up table that comprises different data for the noise correction for different combinations of the target sensitivity and exposure correction value (or of the recording sensitivity and exposure correction value or of the recording sensitivity and target sensitivity).

In method step 37, respective model parameters may, for example, be read out from the look-up table with which a model of the noise of the image sensor 15 that is also covered by the noise characteristic may then be parameterized. Using this model, a respective noise value may then (also in method step 37) be calculated for each image signal value of the recorded image data and is added to the respective image signal value in order to obtain corrected image data in this way.

In method step 39, respective filter parameters may, for example, be read out from the look-up table with which a noise filter that is also covered by the noise characteristic is parameterized and is determined in this way. The recorded image data may then (also in method step 39) be filtered using this noise filter in order to obtain corrected image data in this way.

In both cases, the corrected image data are ultimately adapted with respect to the noise included therein to the predefined target sensitivity and its difference from the recording sensitivity. Such an adaptation is in particular meaningful if the recorded image data should "match" image data that were previously recorded under other exposure conditions and that are referred to below as reference image data for the purpose of differentiation, insofar as it should not be recognizable that the image data and the reference image data were recorded under different exposure conditions.

Figure 2:
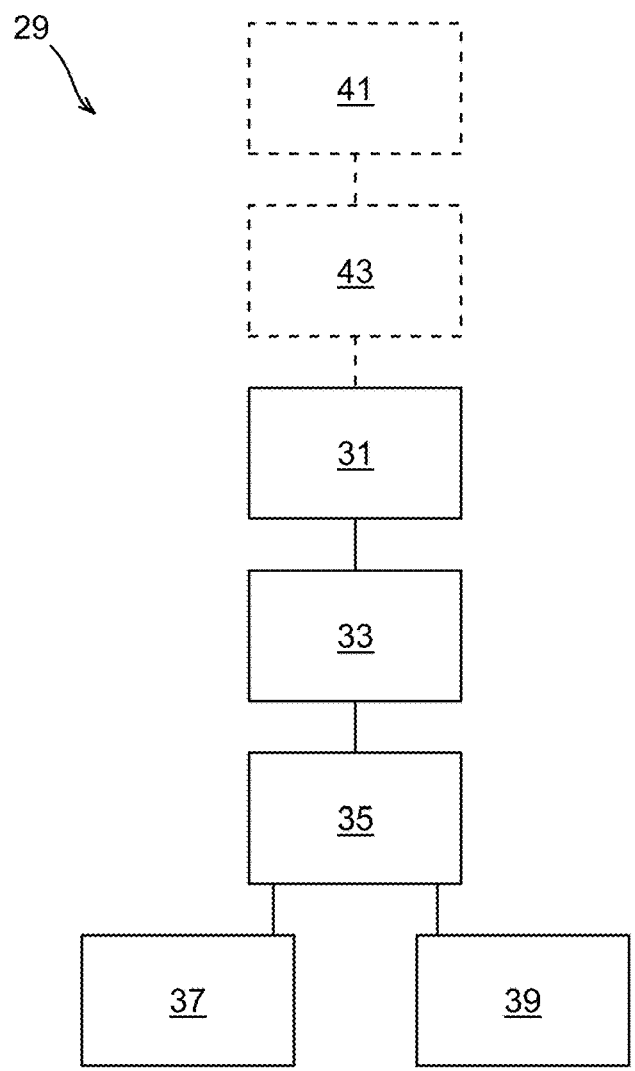
FIG. 2 illustrates, in a schematic representation, the sequence of an embodiment of the method according to the invention.

The method 29 may in this respect also comprise recording the reference image data, namely if it comprises the further method steps 41, 43 that precede the aforementioned method steps 31-39 (shown by a broken line in FIG. 2). In method step 41, reference image data are recorded by means of the camera 11 under given exposure conditions (i.e. under the exposure conditions present at the respective point in time of the recording due to external circumstances and/or respective settings), wherein the sensitivity of the image sensor 15 for this recording is set to the target sensitivity that may be selected substantially freely according to a respective creative intention at this point in time.

After a change in the exposure conditions, which may occur due to external circumstances or as an (undesirable) side effect of an adjustment, which for instance took place for creative reasons, of a setting (for example of the diaphragm aperture) that affects the exposure conditions, the exposure correction value is then determined in method step 43 in dependence on this change in the exposure conditions. The exposure correction value is in this respect expediently determined such that it indicates by how much the exposure must change, in particular by adjusting the sensitivity of the image sensor 15, so that image data recorded under the changed exposure conditions substantially have the same brightness as the reference image data.

The recording sensitivity for the further recording of image data may then be determined from the target sensitivity and the exposure correction value and, in method step 31, may be predefined together with the target sensitivity for the further method steps 33-39. In this respect, the recording sensitivity does not necessarily have to be explicitly determined and predefined since it may also be only indirectly predefined in that, in method step 31, the target sensitivity and the determined exposure correction value are predefined instead.

REFERENCE NUMERALS 11 camera
13 camera housing
15 image sensor
17 lens
19 diaphragm
21 closure
23 control apparatus
25 memory
27 input apparatus
29 method
31-43 method steps

The invention claimed is:

1. A method for recording image data by means of a camera,
wherein the camera comprises an image sensor with an adjustable sensitivity that comprises a plurality of light-sensitive detector elements arranged in rows and columns and that is configured to generate a respective electric charge in dependence on the intensity of light that is incident on a respective detector element during a respective single exposure, to amplify said respective electric charge in dependence on the set sensitivity and to convert it into a respective image signal value,
wherein the method comprises:
a recording sensitivity and a target sensitivity being predefined, wherein the recording sensitivity deviates from the target sensitivity by an exposure correction value;
image data being recorded by means of the camera while the sensitivity of the image sensor is set to the recording sensitivity;
a noise correction being determined in dependence on the target sensitivity and/or the exposure correction value; and
corrected image data being generated by modifying the recorded image data based on the noise correction.

2. A method according to claim 1,
wherein, if the recording sensitivity is lower than the target sensitivity, a respective noise value is determined as the noise correction for each image signal value of the recorded image data and the corrected image data are generated by adding the respective noise value to each image signal value.

3. A method according to claim 1,
wherein, if the recording sensitivity is higher than the target sensitivity, a noise filter is determined as the noise correction and the corrected image data are generated by filtering the recorded image data by means of the noise filter.

4. A method according to claim 1,
wherein the noise correction is determined based on a noise characteristic of the image sensor.

5. A method according to claim 4,
wherein the noise characteristic comprises a theoretical model for the noise of the image sensor and the determination of the noise correction comprises calculating data for the noise correction by means of the model.

6. A method according to claim 4,
wherein the noise characteristic comprises a look-up table and the determination of the noise correction comprises reading out data for the noise correction from the look-up table.

7. A method according to claim 1,
wherein the recording sensitivity and the target sensitivity are predefined directly or indirectly by a user of the camera.

8. A method according to claim 1,
wherein the generation of the corrected image data takes place in the camera.

9. A method according to claim 1,
wherein the method further comprises:
reference image data first being recorded under given exposure conditions by means of the camera while the sensitivity of the image sensor is set to the target sensitivity; and
after a change in the exposure conditions, the exposure correction value being determined in dependence on the change in the exposure conditions.

10. A camera comprising:
an image sensor with an adjustable sensitivity that comprises a plurality of light-sensitive detector elements arranged in rows and columns and that is configured to generate a respective electric charge in dependence on the intensity of light that is incident on a respective detector element during a respective single exposure, to amplify said respective electric charge in dependence on the set sensitivity and to convert it into a respective image signal value; and
a control apparatus that is configured to control the camera to record image data in accordance with a method according to claim 1.

11. A camera according to claim 10,
wherein the camera further comprises:
a memory in which a noise characteristic of the image sensor is stored; and
wherein the control apparatus is configured to read out the noise characteristic from the memory and to determine the noise correction based on the read-out noise characteristic.

12. A camera according to claim 10,
wherein the camera further comprises:
an input apparatus through which the recording sensitivity, the target sensitivity and/or the exposure correction value can be predefined.

13. A method for generating image data by a camera,
wherein the camera comprises an image sensor that has an adjustable sensitivity and that comprises a plurality of light-sensitive detector elements arranged in rows and columns, wherein the image sensor is configured to generate a respective electric charge in dependence on the intensity of light that is incident on a respective detector element during a respective single exposure and to convert the respective electric charge into a respective image signal value,
wherein the method comprises the following steps:
determining a predefined recording sensitivity and a predefined target sensitivity, wherein the predefined recording sensitivity deviates from the predefined target sensitivity by an exposure correction value;
while the sensitivity of the image sensor is set to the predefined recording sensitivity, forming image data based on the image signal values that correspond to the respective single exposure;
determining a noise correction in dependence on at least one of the predefined target sensitivity or the exposure correction value; and
generating corrected image data by modifying the recorded image data based on the noise correction.

14. A method according to claim 13,
wherein, if the predefined recording sensitivity is lower than the predefined target sensitivity, the step of determining a noise correction comprises determining a respective noise value for the image signal values that form the image data and the step of generating corrected image data comprises adding the respective noise value to the image signal values that form the image data.

15. A method according to claim 13,
wherein, if the predefined recording sensitivity is higher than the predefined target sensitivity, the step of determining a noise correction comprises determining a noise filter and the step of generating corrected image data comprises filtering the image data according to the noise filter.

16. A method according to claim 13, further comprising the step of determining the predefined recording sensitivity and one of the predefined target sensitivity or the exposure correction value based on a user input.

* * * * *